Nov. 23, 1937.    H. R. TEAR    2,100,091
LUBRICATING DEVICE
Filed Feb. 3, 1936    2 Sheets-Sheet 1

INVENTOR
HARRY R. TEAR.
BY John A. Watson
ATTORNEY

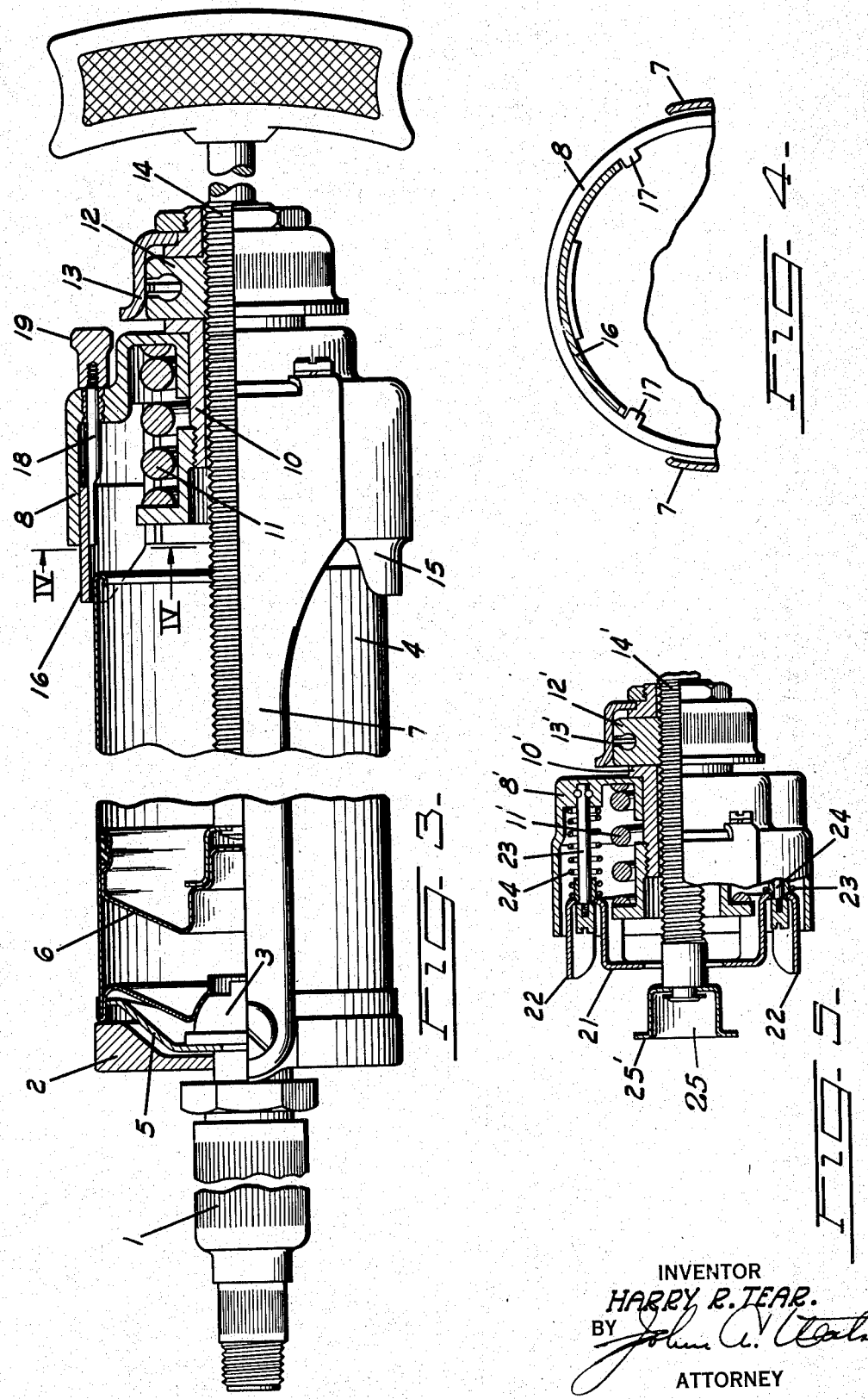

Patented Nov. 23, 1937

2,100,091

UNITED STATES PATENT OFFICE 2,100,091

LUBRICATING DEVICE

Harry R. Tear, Evanston, Ill., assignor to The Lubrication Corporation, Chicago, Ill., a corporation of Delaware Application February 3, 1936, Serial No. 62,057

11 Claims. (Cl. 221—47.3)

This invention relates to lubricating devices and more particularly to lubricant dispensers utilizing quick-attachable, quick-detachable factory-filled cartridges.

In my prior Patent No. 2,025,230 there is disclosed and claimed a lubricating device of this type including a skeleton frame which carries a lubricant pump and a feeding mechanism which may be pivoted out of alinement to permit insertion or removal of a cartridge or into alinement for operation. Such a skeleton frame does not obstruct the visibility of the cartridge and enables an operator to ascertain readily what type of lubricant is in the device, and a customer to ascertain that he is obtaining the kind of lubricant he requested, in addition to having an advertising value for the manufacturer. It has been found, however, that cartridges have a tendency to tilt or cock where a skeleton frame is employed, thereby interfering with proper operation.

Accordingly one of the objects of the present invention is to provide a lubricant dispenser including a skeleton frame in which the lubricant cartridge is held in proper alinement in the frame.

Another object is to provide a lubricant dispenser formed of pivotally interconnected parts in which the parts are held in alinement during use.

In one desirable arrangement there is provided a lubricant pump to which a supply cartridge is adapted to be rigidly secured. A stirrup is pivoted to the pump and constitutes a skeleton frame adapted to be swung into alinement with the cartridge, in which position a feed screw carried by the stirrup may engage a piston in the cartridge to force lubricant therefrom.

A pair of stops, one or both of which is movable, may be carried by the stirrup to engage the cartridge and hold the parts in alinement. In one form, one of the stops is shown as rigid and the other axially slidable while in another form the stops constitute an axially slidable latch which may be operated by movement of the feed screw.

Other objects, advantages and novel features, including desirable detailed constructions, will be apparent from the following description when taken in connection with the accompanying drawings, in which:

Fig. 3 is an enlarged view similar to Fig. 1 with parts in section;

Fig. 4 is a partial section on the line 4—4 of Fig. 3; and

Fig. 5 is a partial section similar to Fig. 3 showing an alternative construction.

Figure 1:
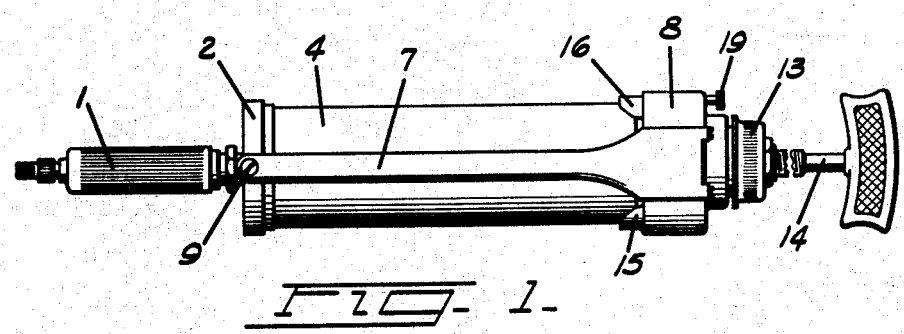
Fig. 1 is a side view of a lubricant dispenser embodying the invention.
Figure 2:
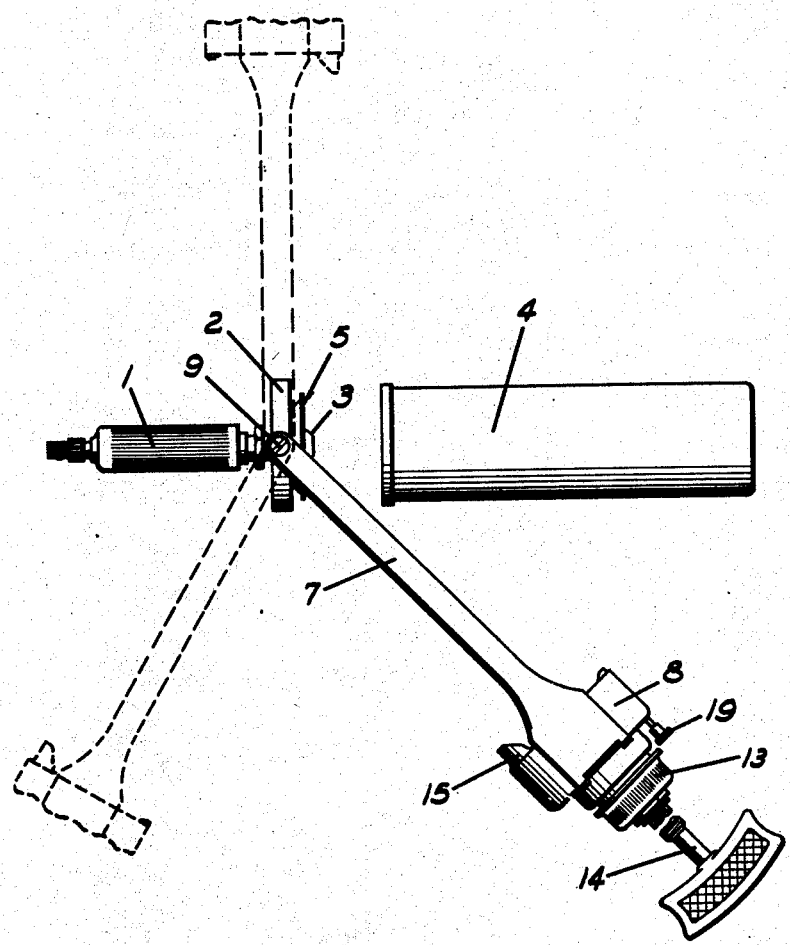
Fig. 2 is a view similar to Fig. 1 with the parts in another position.

The dispenser illustrated in Figs. 1 to 4 is constituted by a high pressure lubricant pump 1 of the push type which is floatingly mounted on a circular head plate 2 in the manner more particularly disclosed and claimed in my copending application Serial No. 743,123, filed September 17, 1934. The pump is formed with an axial inlet defined by a stud 3 having a substantially spherical contact surface which is adapted for sealing engagement with the wall of a lubricant cartridge 4 around the outlet thereof and the pump is rigidly connected to the cartridge by means of a bayonet connector plate 5 which forms a quick detachable joint with suitable bayonet lugs formed in the end of the cartridge. The cartridge is preferably factory filled and includes a follower piston 6 which may be forced therethrough to displace its contents into the pump. Normally the outside of the cartridge will bear suitable indicia to identify the character of lubricant in the cartridge as well as the manufacturer thereof.

A stirrup or skeleton frame constituted by relatively narrow straps 7 and a cap member 8 is pivoted to the head plate 2 as at 9 and carries feeding mechanism for forcing the lubricant from the cartridge. As best seen in Fig. 3 a tubular member 10 is slidably mounted in the cap 8 and is urged forwardly therein by a spring 11. The member 10 has a radial bore in which a screw engaging member 12 is slidable and a cam collar 13 is rotatably mounted on the member 10 to control the screw engaging member 12. A feed screw 14 extends through the member 10 and is provided with a suitable operating handle on its outer end. When the member 12 is out of engagement with the feed screw, the latter can slide freely through the member 10, but when the cam 13 is turned to force the member 12 into engagement with the feed screw it can only be screwed through the member 10. It will be noted that pressure on the feed screw 14 above the initial compression of the spring 11 will compress the spring 11 and slide member 10 through the cap 8. In this way the displacement of member 10 serves as a measure of the force applied to the piston 6 by the feed screw and the spring 11 serves to maintain the lubricant in the cartridge under pressure during the dispensing of a considerable quantity thereof.

The device so far described is substantially similar to that more fully described and claimed in my Patent No. 2,025,230. I have found, however, that in the use of this device some difficulty is encountered due to improper alinement of the parts and tilting thereof in use, particularly between the cartridge and the feeding mechanism. In order to overcome this difficulty and to insure proper alinement of the parts at all times, there is provided, according to the present invention, a stop 15 rigidly secured to the cap 8 and which may engage the cartridge 4 near the end thereof to limit swinging movement between the cartridge and the cap. Diametrically opposite to the stop 15, the cap 8 carries an axially slidable stop or latch 16 which slides on suitable ridges or guides 17 in the cap 8 and whose position is controlled by a rod 18 extending through the cap 8 and having on the outer end thereof a suitable hand button 19.

In operation, the feed screw 14 may be withdrawn and the button 19 may be pulled out to withdraw the latch 16 into the cap 8. If the frame 7 is pivoted about the head plate 2 substantially in the position shown in Fig. 2 a cartridge 4 may be secured to the connector plate 5 with its outlet in communication with the pump inlet. The frame may then be swung into alinement with the cartridge so that the stop 15 engages the cartridge end, the feed screw 14 and latch 16 being withdrawn to clear the cartridge end. The cartridge and frame may be locked in position by pressing the button 19 to move the latch 16 into the position shown in Figs. 1 and 3, after which the feed screw and pump may be operated to dispense lubricant to any desired point of use. To remove the cartridge it is necessary only to withdraw the feed screw and latch 16 and swing the frame out of the way.

Fig. 5 illustrates an alternative latch construction, parts therein corresponding to like parts in Figs. 1 to 4 being indicated by the same reference numerals primed. In this construction the latch is formed as an axially movable member 21 formed with a U-shaped central portion having an opening therein for passage of the feed screw 14' and projecting ends 22 to engage the sides of the cartridge. The latch is supported on and guided by rods 23 extending through openings in the latch and which are preferably cast into the cap 8' although they might be secured to the head in any other suitable manner. Springs 24 are provided surrounding the rods 23 to urge the latch to its outer position in which it will engage the cartridge.

The feed screw 14' carries a cartridge piston engaging head 25 having an annular flange 25' which is larger than the feed screw and the opening in the latch member so that when the feed screw is withdrawn, the flange 25' will engage the latch and withdraw it into the cap 8' against the springs 24. The device of Fig. 5 is intended to be pivotally connected to a head plate such as 2 of Figs. 1 to 4 and is used in the same manner as the device of Figs. 1 to 4, the primary difference being that withdrawal of the feed screw also withdraws the latch.

While two embodiments of the invention have been shown and described it will be apparent that many changes might be made therein and it is not my intention to be limited to the embodiments shown nor otherwise than by the terms of the appended claims.

I claim:

1. In a lubricating device, a lubricant pump, an interchangeable lubricant supply cartridge having a piston therein, means for detachably mounting said cartridge on said pump and for establishing lubricant communication between the pump and cartridge, cartridge piston operating mechanism including means pivotally connected to said pump and adapted to be swung about its pivotal axis into and out of alinement with the cartridge, and means carried by said pivotal means for engaging the cartridge to hold the pivotal means in alinement therewith.

2. In a lubricating device, a lubricant pump, an interchangeable lubricant supply cartridge having a piston therein, means for detachably mounting said cartridge on said pump and for establishing lubricant communication between the pump and cartridge, cartridge piston operating mechanism including a skeleton frame extending about said cartridge and pivotally secured at its forward end to said pump, and means carried by said frame for engaging the rear end of the cartridge to hold the frame in alinement therewith.

3. A lubricating device comprising a lubricant pump having an inlet, means for detachably securing a lubricant supply cartridge to the pump with its outlet in communication with the pump inlet, a skeleton frame pivotally mounted on said pump and including members extending parallel with the axis of the cartridge when the cartridge is mounted on the pump, means carried by the frame for placing lubricant in the cartridge under pressure to force it into the pump, and releasable means carried by the frame and engageable with the cartridge to hold the frame and the cartridge in alinement.

4. A lubricating device comprising an elongated substantially cylindrical pump, means for rigidly securing a cylindrical lubricant cartridge coaxially to said pump with its outlet in communication with the pump inlet, a stirrup pivoted to said pump and adapted to swing into alinement with the pump and cartridge, means carried by said stirrup for holding the stirrup and cartridge in alinement, and feeding mechanism carried by said stirrup at the end thereof remote from the pump for forcing lubricant from the cartridge into the pump.

5. In a lubricating device having a pump to which a lubricant cartridge is adapted to be secured, a stirrup pivoted to said pump, and feeding mechanism carried by the stirrup, a stop member carried by said stirrup and engageable with said cartridge to limit movement of the stirrup relative to the cartridge in one direction, and releasable latch carried by said stirrup and engageable with the cartridge to limit movement of the stirrup relative to the cartridge in the other direction.

6. In a lubricating device having a pump to which a lubricant cartridge is adapted to be secured, a stirrup pivoted to said pump, and feeding mechanism carried by the stirrup, a stop member carried by said stirrup and engageable with said cartridge to limit movement of the stirrup relative to the cartridge in one direction, and a latch slidable axially of the cartridge and engageable therewith to limit movement of the stirrup relative to the cartridge in the other direction.

7. A lubricating device comprising a lubricant pump having an inlet, means for detachably securing a lubricant cartridge to said pump with its outlet in communication with said inlet, means pivotally secured to said pump and movable into alinement with said cartridge, feeding mechanism carried by said last named means and movable into engagement with the cartridge to force lubricant therefrom, and releasable means carried by said pivotal means and connected to said feeding mechanism to be operated thereby for holding said pivotal means in alinement with the cartridge.

8. A lubricating device comprising a lubricant pump having an inlet, means for detachably securing a lubricant cartridge to said pump with its outlet in communication with said inlet, means pivotally secured to said pump and movable into alinement with said cartridge, feeding mechanism carried by said last named means and movable into engagement with the cartridge to force lubricant therefrom, said feeding mechanism including an axially movable feed screw, and releasable means connected to the feed screw to be operated by axial movement thereof for holding said pivotal means in alinement with the cartridge.

9. A lubricating device comprising a pump, means for detachably securing a lubricant cartridge to the pump, a stirrup pivoted to the pump and movable into alinement with the cartridge, an axially movable feed screw carried by the stirrup for forcing lubricant from the cartridge, and axially movable latch means carried by the stirrup and engageable with the cartridge to hold the stirrup and cartridge in alinement.

10. A lubricating device comprising a pump, means for detachably securing a lubricant cartridge to the pump, a stirrup pivoted to the pump and movable into alinement with the cartridge, an axially movable feed screw carried by the stirrup for forcing lubricant from the cartridge, and axially movable latch means carried by the stirrup and engageable with the cartridge to hold the stirrup and cartridge in alinement, said latch means being connected to the feed screw to be operated by axial movements thereof.

11. A lubricating device comprising, a head carrying lubricant discharge means having an inlet opening, means to secure a lubricant cartridge to said discharge means with its outlet in communication with said inlet, a skeleton frame pivotally mounted on said head and including members extending parallel with the axis of the cartridge, means carried by said frame for placing lubricant in the cartridge under pressure, and releasable means carried by the frame and engageable with the cartridge to hold the frame and the cartridge in alinement.

HARRY R. TEAR.